(No Model.)
J. B. & G. T. TUCKERMAN.
MACHINE FOR HARVESTING CORN.
No. 521,486. Patented June 19, 1894.
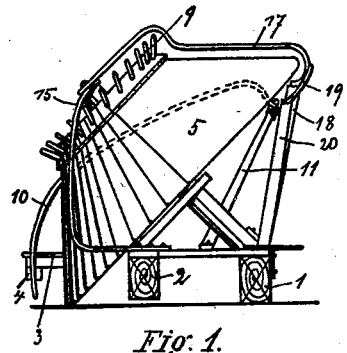
Fig. 1.
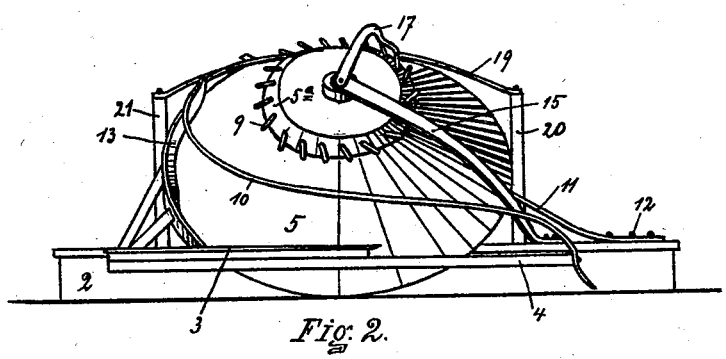
Fig. 2.
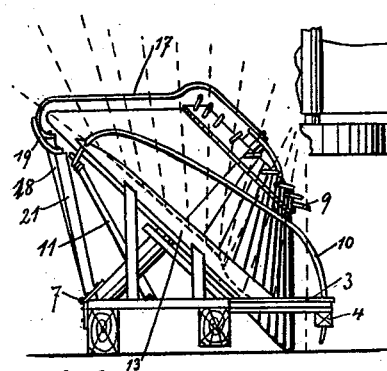
Fig. 3.
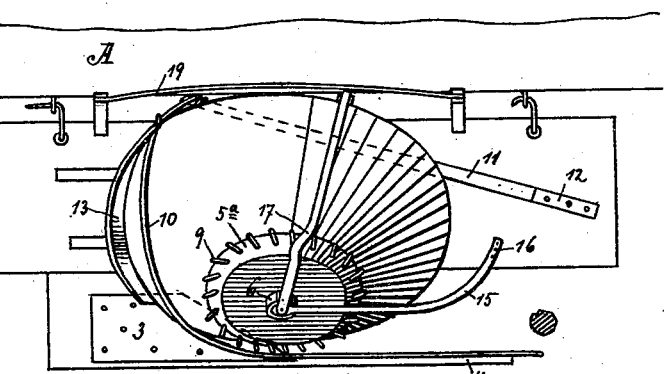
Fig. 4.
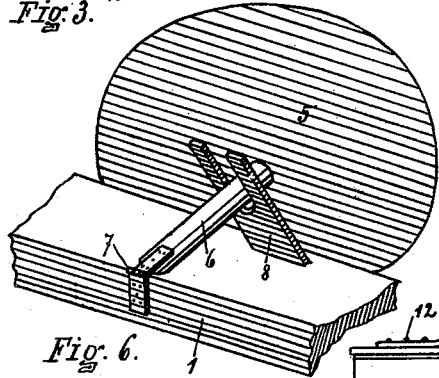
Fig. 6.
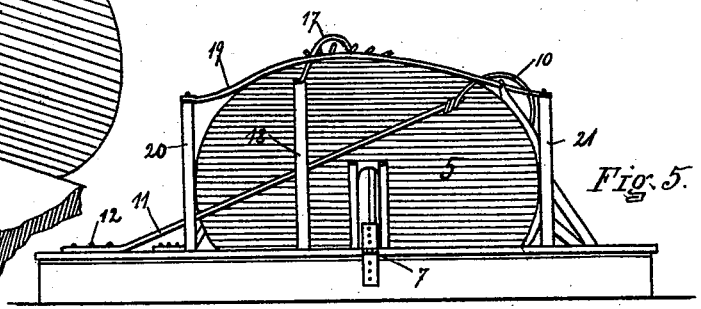
Fig. 5.
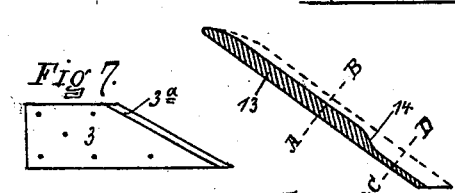
Fig. 7. Fig. 8.ᵃ
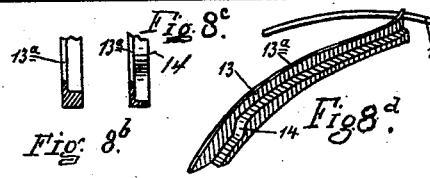
Fig. 8.ᵇ Fig. 8.ᶜ Fig. 8.ᵈ
WITNESSES.
Rich. A. George.
Henry M. Love.
INVENTORS:
JOHN B. TUCKERMAN.
GEORGE T. TUCKERMAN.
BY Risley & Robinson
ATTORNEY'S.
THE NATIONAL LITHOGRAPHING COMPANY,
WASHINGTON, D. C.

UNITED STATES PATENT OFFICE.

JOHN B. TUCKERMAN AND GEORGE T. TUCKERMAN, OF CASSVILLE, NEW YORK.

MACHINE FOR HARVESTING CORN.

SPECIFICATION forming part of Letters Patent No. 521,486, dated June 19, 1894.

Application filed March 15, 1893. Serial No. 466,077. (No model.)

*To all whom it may concern:*

Be it known that we, JOHN B. TUCKERMAN and GEORGE T. TUCKERMAN, both of Cassville, in the county of Oneida and State of New York, have invented certain new and useful Improvements in Machines for Harvesting Corn, &c.; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our present invention relates to an improvement in machines for cutting corn.

In the drawings which accompany and form a part of this specification and in which similar figures of reference refer to corresponding parts in the several views, Figure 1 shows a front end elevation of our improved machine. Fig. 2 shows a side view as seen from the left of Fig. 1. Fig. 3 shows a rear end view of the machine. Fig. 4 shows a plan view. Fig. 5 shows the opposite side from that shown by Fig. 2. Fig. 6 shows details of the mechanism for holding the conical carrier. Fig. 7 shows the cutting knife in detail. Figs. 8$^a$, 8$^b$, 8$^c$ and 8$^d$ show details relating to a guiding trough and holder.

In constructing our machine we provide a frame mounted on skids or runners as 1—2 and adapted to be drawn forward by a horse attached to the front end, the frame being in the nature of a sled. Secured on the rear portion of the sled is a knife 3 having its cutting edge 3$^a$ diverging from the sled in a forward direction. From the outer side of the knife extends a projecting finger 4. Running on its periphery in the space between the finger 4 and the frame of the machine is provided a cone or stalk carrier 5. The cone or carrier 5 is mounted on an inclined shaft 6 hinged at 7 at its foot to the frame and engaged above its foot between the prongs of a fork 8 rigidly secured on the frame whereby the cone is free to have a swinging movement independent of the frame. The smaller end of the cone is provided with a raised band 5$^a$ in which are provided a series of inclined pins 9. It will be noted that the periphery of the cone runs just in advance of the cutting edge of the knife 3. Secured at the forward end of the finger 4 and gradually rising and curving about the cone is provided a stalk guide and holder 10, which is semi-flexible to conform to the shape of the cone and is held at its opposite end by being attached to the end of spring 11 secured on the frame at 12, and operating to draw the stalk holder taut around the cone and diagonally across the face of it, as shown. Adjacent to the base of the cone and on the rear side and starting at a point close to the knife is provided a butt retaining and guiding trough 13. This device is provided with a wall on its outer side and lies close to and substantially conforms on its inner side to the periphery of the cone. In the bottom of the trough is provided a tripping shoulder 14 against which the butts of the cut stalks engage as they pass through the machine. The retaining and holding trough is perforated at its upper end and the stalk holder 10 passes through the opening and is held thereby in fixed position relative to the cone. Secured on the end of the shaft on which the cone revolves on the outer end thereof is one end of the stalk guide 15. The stalk guide inclines downward and forward and is secured at its other end at 16 to the frame of the machine. At 17 is shown a rod which is secured at one end on the shaft 6 at the small end of the cone and passing across the top of the cone a little in advance of its general central line is secured at the other end to a standard 18 provided on the frame. This device is a holder for the stalks after they are cut.

The device is intended for cutting corn in rows or drills, and in operation is drawn forward so that the stalks of corn will enter between the finger 4 and the frame of the machine. As they enter, any broken or weak stalks are engaged by the guides 10 and 15 and brought into a substantially vertical position to be operated on by the machine. As the machine moves forward the cone 5 revolves by reason of its periphery running on the ground, and as the stalks of corn pass in behind the finger 4 they are engaged by the pins 9 on the smaller end of the cone and as they further pass in they are clamped against the cone by the tension of the stalk holder 10.

About this time the cutting edge of the knife 3 reaches them and severs them from the ground. As the device proceeds forward the stalk is carried upward by the cone and the pins in the cone, it being held thereto by the holder or keeper 10, and the butt of the stalk becomes engaged in the butt retaining trough 13. As it continues up in the trough it is engaged by the tripper 14 which turns the stalk on the face of the cone and under the holder 10, and with the continued movement of the cone the stalk is carried through under the keeper 10, and finally as the keeper and butt holding device come together the stalk passes out from under the keeper and the forward end of it falls on to the holder 17 while the butt portion of the stalk may lie on the periphery of the cone and the cone slips under it, and when a sufficient number have accumulated in this position, they may be removed by the attendant. An additional holder as 19 may be provided extending along the side of the cone and supported on posts 20 and 21. The upper edge of the cone and accompanying parts are to overhang the edge of a wagon and the stalks delivered wholly or partially upon it.

It will be understood that the device will operate on a number of stalks of corn simultaneously, the stalks being in all of the several positions of movement just described from the time they are severed until they take their positions with the forward end on the holder 17 or 19 and the butt end resting on the periphery of the cone or balanced over the holder 19. The general movements of the stalks from the time they are cut until they cease to be moved by the cone, are shown in dotted lines in Fig. 3. The whole device may also be attached to the side of a wagon as A by suitable connections or hooks as shown in Fig. 4 and be moved forward by or in connection with the wagon.

It is evident that numerous changes and variations in and from the construction herein described, may be made without departing from the equivalents of our construction.

What we claim as new, and desire to secure by Letters Patent, is—

1. The combination in a corn harvesting machine, of a frame, a knife secured on the frame and having its cutting edge converging with the frame, of a stalk handling cone secured on the frame and having its periphery running on the ground, and a stalk holder passing partially around the cone, substantially as set forth.

2. The combination in a corn harvesting machine, of a frame, a knife secured on the frame, a stalk handling cone mounted on an inclined shaft held in the frame, and having its periphery running on the ground and its upper face in a substantially horizontal position, of a stalk holder passing partially about the cone, and a series of inclining pins fixed in the cone to engage the upper ends of the stalks, substantially as set forth.

3. In a corn harvesting machine, a frame, a knife secured in the frame and having its cutting edge converging with the frame, a finger projecting forward from the outer end of the knife, a cone-shaped stalk carrier mounted on a movable shaft in the frame and having its periphery running on the ground in the opening between the finger and the frame, a semi-flexible stalk holder secured to the end of the finger and passing thence to the side of the cone and partially around the cone, a series of stalk engaging inclined pins secured in the smaller end of the cone, combined substantially as set forth.

4. In a corn harvester, the combination of a frame, a knife secured on the frame and having its cutting edge converging with the side of the frame, a stalk handling cone mounted upon a swinging shaft and running on its periphery on the ground in advance of the knife, a stalk holding band partially surrounding the cone, a trough-like device for engaging the butts of the severed stalks, and converging with the strap for holding the stalks, substantially as set forth.

5. In a corn harvester, a frame, adapted to be moved forward, a knife secured on the rear portion of the frame and having its cutting edge converging with the side of the frame, a finger projecting forward from the knife substantially parallel with the side of the frame, a corn handling cone mounted upon a vibrating shaft and having its periphery running on the ground between the finger and side of the frame and in advance of the knife, a stalk guide and holder secured at its front to the finger and rising and curving diagonally around and across the face of the cone, and secured at its opposite end to a yielding spring, a circle of inclined stalk engaging pins provided in the smaller end of the cone, a butt holding device adjacent to the periphery of the cone and starting from a point adjacent to the cutting edge of the knife, and a stalk supporter secured above the periphery of the cone, all combined, substantially as set forth.

6. In a harvesting machine, a frame, a knife, a rotary stalk-carrier operated by direct traction on the ground and a holder in opposition to a portion of the periphery of the carrier, combined substantially as set forth.

7. In a corn harvesting machine, a frame, a knife, a rotary conical stalk-carrier running in direct contact with the ground and driven by traction therefrom, and a stalk-holder adapted to hold the stalks on the periphery of the carrier, combined substantially as set forth.

In witness whereof we have affixed our signatures in presence of two witnesses.

JOHN B. TUCKERMAN.
GEORGE T. TUCKERMAN.

Witnesses:
CARLTON TOWNSEND,
HEZEKIAH MANCHESTER.